March 12, 1957 G. E. KING 2,785,357
DYNAMIC BRAKING FOR WARD LEONARD SYSTEM
Filed March 21, 1955
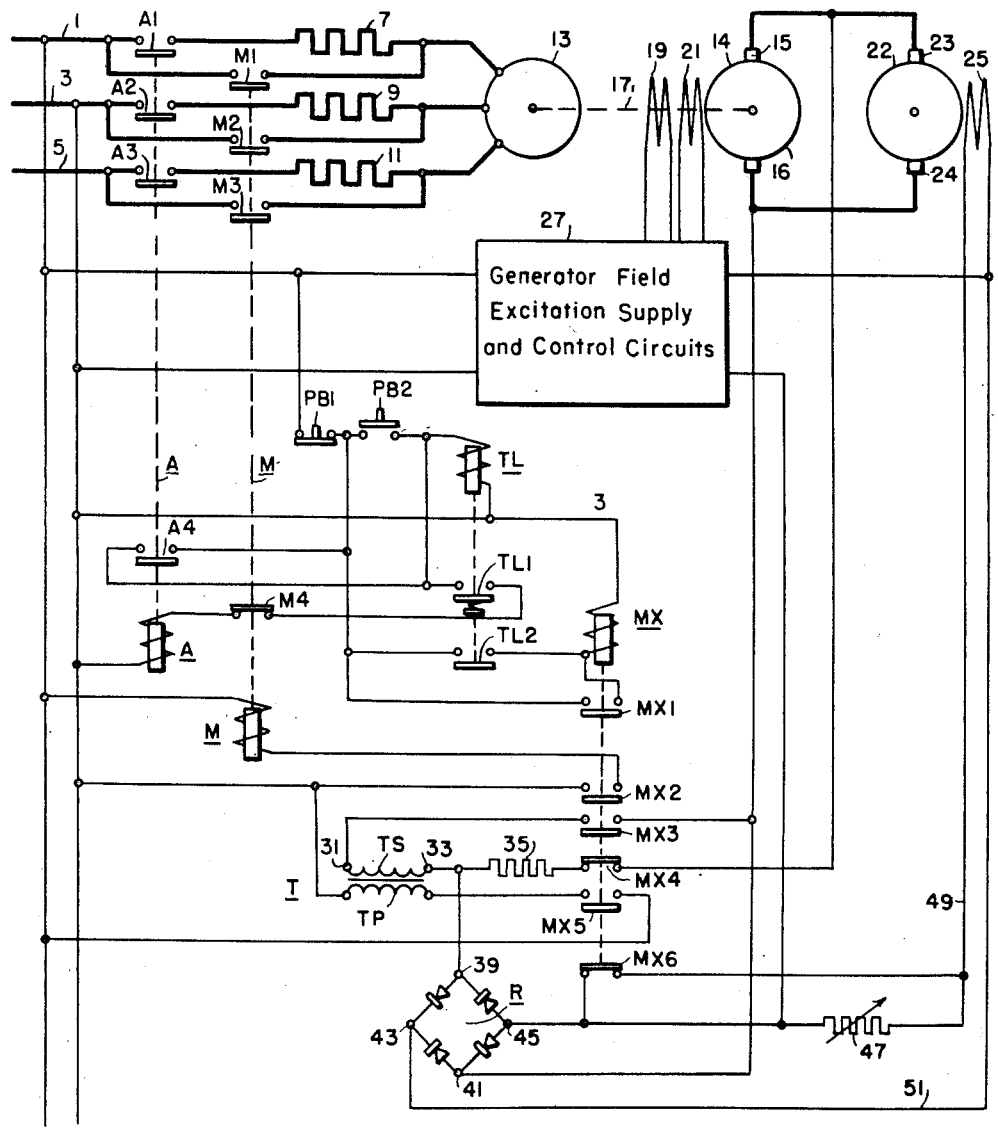
WITNESSES:
E. A. McCloskey.
John B. Davidson
INVENTOR
George E. King.
BY
Paul E. Friedemann
ATTORNEY 2,785,357
Patented Mar. 12, 1957

2,785,357
DYNAMIC BRAKING FOR WARD LEONARD SYSTEM

George E. King, Eggertsville, N. Y., assignor to Westinghouse Electric Corporation, East Pittsburgh, Pa., a corporation of Pennsylvania Application March 21, 1955, Serial No. 495,400

8 Claims. (Cl. 318—140)

My invention relates broadly to variable voltage motor control systems and, more particularly, to means for supplying motor field excitation for such systems.

In the past, it has been common practice to utilize separate constant voltage motor driven generators to supply field excitation voltage to the separately-excited drive motor of a variable voltage control system. The motor may drive a high inertia reciprocating mechanism, such as a machine tool of the nature of a planer, drawcut shaper, roll grinder, and the like. If the drive motor is to be adequately protected against severe damage in the event of a general power failure, it is imperative that dynamic braking be employed in order to quickly stop the motor. One reason for using such a relatively expensive device as a separate motor generator set for field current supply is that this object is readily accomplished thereby. The set itself has considerable inertia and rotates at high speed, so that even though there is a general power failure, excitation current will be supplied to the drive motor for a period of time more than adequate to dynamically brake the motor.

A static rectifier would obviously be preferable to a motor generator set from a cost standpoint, but heretofore the advantages of dynamic braking has had to be foregone if such devices were to be utilized.

It has been known heretofore to achieve dynamic braking of a separately excited motor by connecting the separately excited field winding directly across the armature so that the back E. M. F. of the motor will supply its own field current during the braking cycle. A dynamic braking system of this type may be found in U. S. Patent No. 2,315,511 to R. S. Elberty, Jr. Obviously, however, this teaching is impractical where it is necessary to reverse the direction of motor rotation at regular intervals in accordance with the armature voltage supplied thereto from an external source.

Accordingly, it is one object of my invention to provide dynamic braking for the drive motor of a high inertia mechanism, the field excitation of which drive motor is derived from a static current-supply source.

Another object is to protect a high inertia mechanism against damage upon general power failure by providing a dynamic braking system for the drive motor thereof.

Still another object is to utilize the armature back voltage of a reversible separately-excited direct-current motor to provide dynamic braking thereof, regardless of the direction of rotation of the rotor member of the motor.

To achieve the foregoing objects, as well as others which will become apparent upon consideration of the detailed description of my invention and the accompanying diagrammatic showing, in a single figure, of one embodiment of my invention, I provide a rectifier R, preferably of the full-wave bridge type, to supply the field winding 25 of the drive motor 22 with exciting current derived from an alternating current source. Upon failure of the alternating current source, such as may be caused by a severe overload or by a general breakdown at the generating station, the input terminals 39 and 41 of the rectifier R are simultaneously disconnected from the alternating current supply lines and connected across the armature of the drive motor 22. The back voltage of the motor is rectified by the bridge rectifier R and applied thereby to the separately excited motor field winding 25; the polarity of the output voltage from the rectifier R is always such as to supply current of the proper direction of flow to the motor field winding to effect dynamic braking of the motor.

In the single figure of the drawing I show a direct current drive motor 22 connected in a series loop with a direct-current generator 14, the armature terminals 15 and 16 of the generator being respectively connected to the armature terminals 23 and 24 of the motor. The motor may be connected to a reciprocating machine tool, or other appropriate device, by means of gears or other convenient coupling devices. Motor 22 is provided with a separately-excited field winding 25, and the generator 14 is shown as being provided with two separately-excited field windings 19 and 21. Excitation is supplied to the field windings of the motor and generator in a manner that will be described below. Generator 14 is driven through shaft 17 from a three-phase alternating current motor 13 which may be of any conventional type well known to the art, but preferably is a synchronous machine so as to drive the rotating member of the generator 14 at a constant speed.

Alternating current motor 13 is supplied with power from the A. C. power lines 1, 3 and 5. These lines may be energized from a separate A. C. generator (not shown), or from commercial power sources. To provide a reduced starting voltage, lines 1, 3 and 5 are connected to the power terminals of motor 13 through resistors 7, 9 and 11, and to the normally open contact members A1, A2 and A3, respectively, of relay A. Under normal operating conditions, the full voltage available from lines 1, 3 and 5 is connected to the motor by means of normally-open contact members M1, M2 and M3 of relay M, which respectively short-circuit resistor 7 and contact A1, resistor 9 and contact A2, and resistor 11 and contact A3.

Under starting conditions and normal operating conditions, excitation current for field winding 25 of motor 22 is derived from lines 1 and 3 through transformer T and rectifier R.

Field winding 25 and variable resistor 47 are serially connected across the output terminals 43 and 45 of bridge rectifier R. The input terminal 39 of rectifier R is connected directly to terminal 33 of the secondary TS of transformer T; the other input terminal 41 of the rectifier R is connected to the other terminal 31 of secondary TS of transformer T by means of contacts MX3 of relay MX.

Relay MX is provided with four normally open contacts MX1, MX2, MX3 and MX5, and two normally closed contacts MX4 and MX6 all of which are substantially simultaneously actuated upon energization of the relay coil. The primary winding TP of transformer T is connected across A. C. lines 1 and 3 by means of contact member MX5. Contact MX6 is adapted to short-circuit resistor 47 so as to apply the full output voltage of rectifier R to field winding 25 when the actuating coil of the relay is deenergized. Contact MX4 connects rectifier input terminal 39 to motor terminal 23 and generator terminal 15 through voltage dropping resistor 35.

When the control is to be actuated, the starting switch, that is, the normally open push button PB2 is actuated, whereupon a circuit is established from conductor 1 through the stop switch, that is the normally closed push button PB1, the starting switch PB2, the actuating coil of the time delay relay TL to the conductor 3.

The contact TL1 is so coupled to the armature of the time delay relay to close substantially instantaneously upon energization of the time delay relay. A circuit is thus established from conductor 1 through the stop switch PB1, starting switch PB2, contact TL1, contact M4 of the main contactor M and the actuating coil of contactor A to conductor 3. The contactor A operates immediately to close contacts A1, A2 and A3 to connect the motor 13 to the A. C. supply through the voltage reducing resistors 7, 9 and 11. The motor 13 thus accelerates to a relatively high percentage of its full speed on reduced voltage.

The contact TL2 is so coupled to the armature of time limit relay TL that the circuit it controls is closed after a time delay. The time delay is so adjusted as to match the desired acceleration of the motor 13 on the low voltage connection.

When contact TL2 closes, a circuit is established from conductor 1 through the stop switch PB1, contact TL2, the actuating coil of relay MX to the conductor 3, whereupon relay MX closes its contacts MX1, MX2, MX3 and MX5 and to open its contacts MX4 and MX6. The closure of contact MX1 establishes a holding circuit for relay MX and the closure of contacts MX2 establishes an energizing circuit for the actuating coil of the full voltage, or main contactor M. The motor 13 is thus connected directly to the A. C. supply and attains its full constant speed by reason of the closure of contacts M1, M2 and M3.

The closure of contact MX5 connects the primary winding TP of transformer T to the leads 1 and 3. The transformer secondary TS thus produces a voltage output which, by reason of the closure of contact MX3, is applied to the input terminals 39 and 41 of rectifier R.

Box 27 designates, in general form, the excitation supply and control circuits for the field windings 19 and 21 of generator 14. These excitation supply and control circuits may be of the form shown in my copending application with A. O. Fitzner, Serial No. 494,992, filed March 17, 1955, of the type shown in my patent No. 2,322,637, or other types of similar motor control circuits well known to the art. If a reciprocating machine is to be driven by drive motor 22, it is essential that the excitation supply and control circuits be of such a nature as to reverse the polarity of the output voltage of generator 14 in a minimum amount of time, so as to keep the amount of overtravel of the driven machine to the very minimum. To supply requisite direct-current power to control circuit 27, connections may be made across the output terminals 43 and 45 of rectifier R, and, if necessary, appropriate filter circuits may be included to minimize the amount of ripple voltage passing to the control circuits. Likewise, if necessary, alternating current power required by the excitation supply and control circuits may be supplied directly from any or all of the A. C. power lines 1, 3 and 5.

The opening of contact MX6 connects the field winding 25 to the output terminals 43 and 45 of the rectifier R through adjustable resistor 47. Resistor 47 may be adjusted to provide field excitation in accordance with the desired operating speed of the motor 22. The field excitation supply and control circuits 27 will be energized, thus providing excitation to field windings 19 and 21 in accordance with the setting of the control devices included within the control circuits, as described in my application and patent reference above.

After motor 13 reaches its operating speed, the polarity and magnitude of the output voltage of the generator 14 will vary in accordance with the field excitation applied thereto.

When the actuating coil of relay MX is deenergized, either by momentarily pressing the stop switch PB1, or by voltage failure of the supply, contact member MX4 will close to connect the armature terminals 23 and 24 of motor 22 across the input terminals 39 and 41 of rectifier R; contact member MX5 will open to open circuit the primary winding TP of transformer T, and contact member MX3 will open to disconnect the secondary winding TS of transformer T from the input terminals of rectifier R. Likewise, contact MX6 will close to short-circuit the resistor 47. The back voltage of motor 22 will be applied to the field winding 25 through the rectifier R. Inasmuch as the rectifier R is of the full wave bridge type, the polarity of the voltage applied to the field winding 25 will always be the same. The flux in the field winding of the motor 22 will be in a direction to provide dynamic braking of the motor, regardless of the direction of rotation thereof immediately before relay MX dropped out.

Note that in the event of power failure, a finite relatively small interval of time will elapse before relay MX drops out. This means that during this time interval, no excitation will be supplied to field winding 25, neither from the alternating current supply source, nor as a result of the back voltage of motor 22. However, due to the very low resistance of the rectifier R the field winding 25 is effectively short-circuited. This short-circuit across the motor field 25 will slow down the decay of the flux, so that the motor will brake during the transition time before relay MX drops out.

Note also that by shorting resistor 47, the motor field flux will build up after relay MX drops out inasmuch as the voltage applied to the input terminals of the rectifier R as a result of the back voltage from motor 22 can be made greater than the output voltage of transformer T, and also because resistor 47 has been short-circuited by contact MX6, thus applying the full rectifier output voltage to the field winding.

It is thus apparent that by the teachings of my invention, there has been provided an excitation supply system for a D. C. motor, wherein only static excitation supply components are necessary. Dynamic braking of the motor may be achieved regardless of the direction of motor rotation, thus protecting the driven mechanism against damage in the event of a general power failure.

The invention is not to be restricted to the specific structural details, arrangement of parts, or circuit connections herein set forth, as various modifications thereof may be effected without departing from the spirit and scope of this invention.

I claim as my invention:

1. In a motor control system including a reversible polarity direct-current generator for supplying armature voltage to a direct-current motor having a separately-excited field winding, and a source of alternating current: full wave bridge rectifier means having input terminals and output terminals, said output terminals being coupled across said motor field winding; relay means adapted to connect the input terminals of said rectifier to said alternating current source when energized by said alternating current source and to connect said input terminals across the armature of said direct-current generator when not energized by said alternating current source.

2. In a motor control system including a reversible polarity direct-current generator for supplying armature voltage to a direct-current motor having a separately-excited field winding, and a source of alternating current: full wave bridge rectifier means having input terminals and output terminals, said output terminals being coupled across said motor field winding; means adapted to connect the input of said rectifier only to said alternating current source when the voltage of said source is at least of a predetermined magnitude and to connect said input terminals only to the armature of said direct-current motor when said voltage of said source is less than a predetermined magnitude.

3. In a motor control system including a reversible polarity direct-current generator for supplying armature voltage to a direct-current motor having a separately-excited field winding, and a source of alternating current: full wave bridge rectifier means having input terminals and output terminals, said output terminals being coupled across said motor field winding; relay means having an actuating coil connected across said alternating current source adapted to connect the input terminals of said rectifier across the armature of said motor only when said actuating coil is not energized, and to couple said input terminals to said alternating current source only when said actuating coil is energized.

4. In a motor control system for a motor having a separately-excited field winding to be excited from an alternating current source: rectifier means having input terminals and output terminals, said output terminals being connected across said motor field winding; means adapted to connect the input terminals of said rectifier only to said alternating current source when the voltage of said source is of at least a predetermined magnitude, and to connect said input terminals only to the armature of said direct-current motor when said voltage of said source is less than said predetermined magnitude.

5. In a motor control system including a reversible polarity direct-current generator for supplying armature voltage to a direct-current motor, having a separately-excited field winding: a source of alternating current; transformer means having a primary winding and a secondary winding, said primary winding being connected to said alternating current source; full wave bridge rectifier means having input terminals and output terminals, said output terminals being coupled across said motor field winding and said input terminals being connected to said secondary winding of said transformer; relay means adapted to connect the input terminals of said rectifier to the secondary winding of said transformer when said relay means is energized by said alternating current source, and to connect said input terminals of said rectifier across the armature of said direct-current generator when said relay means is not energized by said alternating current source.

6. In a motor control system including a reversible polarity direct-current generator for supplying armature voltage to a direct-current motor, having a separately-excited field winding: a source of alternating current; transformer means having a primary winding and a secondary winding, said primary winding being connected to said alternating current source; full wave bridge rectifier means having input terminals and output terminals, said output terminals being coupled across said motor field winding and said input terminals being connected to said secondary winding of said transformer; means adapted to connect the input terminals of said rectifier to the secondary winding of said transformer only when the voltage of said alternating current source is at least of a predetermined magnitude, and to connect said input terminals to the armature of said direct-current motor only when said voltage of said alternating current source is less than a predetermined magnitude.

7. In combination: a direct-current generator having separately-excited field winding means thereon; field current supply means connected to said field winding; means adapted to supply an exciting current to said field winding means so as to selectively vary the polarity and magnitude of the output voltage from said generator; direct-current motor means having its armature circuit in a series loop with the armature of said generator; alternating current supply means; bridge rectifier means having input terminals and output terminals; said motor having a separately-excited field winding connected across the output terminals of said rectifier; and means adapted to selectively connect said rectifier input terminals to said alternating current supply source and across said motor armature.

8. In combination: a direct-current generator having separately-excited field winding means thereon; field current supply means connected to said field winding; means adapted to supply an exciting current to said field winding means so as to selectively vary the polarity and magnitude of the output voltage from said generator; direct-current motor means having its armature circuit in a series loop with the armature of said generator; alternating current supply means; bridge rectifier means having input terminals and output terminals; said motor having a separately-excited field winding connected across the output terminals of said rectifier; and means adapted to selectively connect said rectifier input terminals to said alternating current supply source when the voltage magnitude of said supply source is of at least a given value and to said motor armature when said voltage magnitude is less than a given value.

No references cited.